C. KIRCHHOF.
FIRE ALARM TELEGRAPH.
No. 45,251. Patented Nov. 29, 1864.
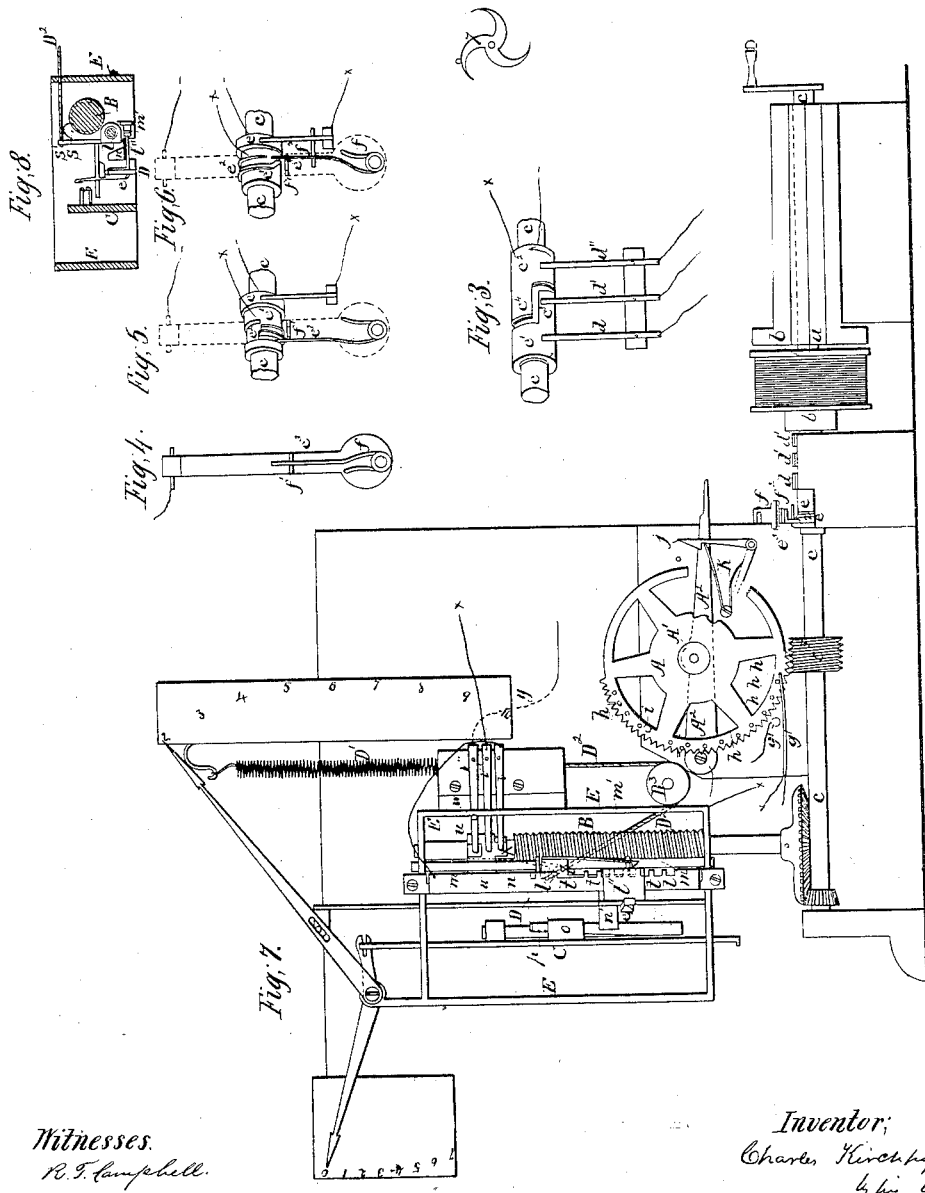

UNITED STATES PATENT OFFICE.

CHARLES KIRCHHOF, OF NEWARK, NEW JERSEY.

IMPROVEMENT IN FIRE-ALARM TELEGRAPHS.

Specification forming part of Letters Patent No. 45,251, dated November 29, 1864.

*To all whom it may concern:*

Be it known that I, CHARLES KIRCHHOF, of Newark, in the county of Essex and State of New Jersey, have invented certain new and useful Improvements in Automatic Fire-Indicators; and I hereby declare that the following is a full, clear, and exact description thereof, reference being had to the accompanying drawings, and to the letters of reference marked thereon, making part of this specification.

To enable others skilled in the art to construct and use my invention, I will proceed to describe it.

Figure 7 represents a side elevation of my improved apparatus. In this figure $a$ represents a permanent magnet with a shaft, $c$, running lengthwise thereof, on which is mounted the induction-coils $b$ by means of the crossbar $b'$, in the usual manner, thus forming the ordinary magneto-electric machine in common use, and which need not, therefore, be further described.

Upon the shaft $c$ is mounted the insulated sectional collars $c'$ and $c^2$, as clearly shown in Fig. 3, and which, in connection with the keys or springs $d$, $d'$, and $d''$, constitute the current changer or commuter in common use, and which need not be herein further described. The application of this commuter here is for the purpose of enabling the operator to change the currents, and thereby to adapt the machine to different receiving-instruments.

In a frame, E, at and above the opposite end of shaft $c$, is mounted a vertical shaft, B, having a screw-thread cut upon its surface nearly its entire length, as shown in Fig. 7. This shaft B is connected to and driven by shaft $c$ by means of the bevel-gear shown in said Fig. 7, or by any other equivalent means.

Mounted in frame E, close by shaft B, is a rod, $m$, upon which slides up and down the device $l$, which I denominate a "traveler," and which is shown, in connection with other parts, in horizontal or transverse section in Fig. 8.

Attached to the body or hub of the traveler $l$ is an arm, $s$, which engages in the screw-thread upon shaft B, by which means the traveler is caused to ascend when shaft B is rotated. Another arm, $s'$, also projects from the rear side of $l$, and to the outer extremity of this arm $s'$ is attached a cord, $D^2$, which, passing underneath pulley $D^3$, then ascends and is connected to the spiral spring $D'$ or its equivalent, as shown in Fig. 7. It will thus be seen that the effect of the cord $D^2$ and spring $D'$ is twofold—first, by drawing sidewise upon the arm $s'$ to force the arm $s$ against the shaft B, so as to cause it to engage in the screw-thread thereon, and thereby cause the traveler $l$ to ascend; and, second, by drawing downward upon arm $s'$ to cause the traveler $l$ to descend the rod $m$ when the arm $s$ is disengaged from the screw-thread of shaft B.

Attached to the traveler $l$, in a vertical position, is a spring, $m'$, the end of which is provided with a projection which is forced against the teeth or projections $t$ on the metal plate $n$. This plate $n$ is located in a suitable position to be operated upon by the spring $m'$, and is insulated by any suitable means from the frame E and the other parts of the apparatus. It will be observed that a space, $t'$, is shown in the edge of plate $n$ equal to the width of several teeth, just above the teeth $t$, the object of which will be hereinafter explained.

Near the left-hand side of plate $n$ is located a sliding plate or strip, D, the upper end of which is secured by a pin and slot to the lever or index X, by which it is raised or depressed, as desired. A plate, $t''$, is secured to the right-hand side of D, in such a position that it projects alongside and in front of plate $n$, its right-hand edge projecting slightly beyond the teeth $t$ on said plate $n$, so that when the spring-arm $m'$ of the traveler $l$ comes opposite said plate $t''$ the arm $m'$ shall be prevented from coming in contact with the teeth $t$ on plate $n$. The traveler $l$ has also an arm, $n'$, projecting to the left, which, as the traveler is made to ascend by the screw on shaft B, is pressed against the face of spring $p$ secured to the side of the strip or plate C, which latter is adjustable the same as D, and is operated in a similar manner by the index-lever Z. This arm $n'$ is held in contact with the face of spring $p$ by the same means that keeps the arm $s$ engaged with the screw on shaft B—to wit, the spiral spring $D'$ and cord $D^2$, operating on arm $s'$ and tending to draw the traveler around to the right on rod $m'$—and it is thus kept in contact until, as the traveler ascends, the arm $n'$ passes up behind the stud $o$ and arrives near the upper end of spring $p$, above $o$, as indicated in red, when the pressure of spring $p$, overcoming the force exerted by the spiral spring D', throws the arm n' forward, whereby the traveler is partially rotated to the left, thereby disengaging the arm s from the screw on shaft B, when the traveler is instantly drawn down by the cord D² and spring D', unless stopped by obstructing mechanism properly located for that purpose, to a point near the bottom of frame E, where its descent is arrested by the arm n' coming in contact with a projection or shoulder on the rear edge of plate D.

Secured to the rear side of arm n' is a spring-arm, e, standing horizontally at right angles to n', and projecting forward to such a distance that when n' is thrown forward by the action of spring p a small hook on the end of e shall catch over the front edge of strip D, whereby the arm s is kept from re-engaging with the screw-shaft B during the descent of the traveler and after the spring p has ceased to operate on arm n'.

At a point on the edge of D directly opposite plate t'' there is a notch or recess of a length corresponding with the width of e, so that when e, in its descent along the face of D, arrives at that point its hooked end slips out through this notch, whereby the arm e is disengaged from D, thus allowing the traveler to partially rotate to the right again, and thereby throw the arm s into connection with the screw, ready for a repetition of the operation.

It should be observed that were it not for the arm e hooking over the face of D, and thus keeping the traveler turned to the left during its entire descent, the force of spring D, operating through cord D² on arm s', would immediately pull the traveler around to the right, whereby the arm s would be prematurely brought into contact with the screw-shaft B and the descent of the traveler instantly arrested. A commuter or current-changer is also shown applied to the shaft B; but as that is intended to be used only in connection with a novel construction of lines upon which I contemplate making a separate application for Letters Patent any further description thereof is deemed unnecessary in this specification.

A line connects one pole of the magneto-electric machine with the frame E, while another connects the opposite pole with the metallic plate n, and as this plate n is insulated from the rest of the machine it is obvious that no current can pass between plate n and the other parts of the machine, except when a connection is made by means of the spring m' coming in contact with the teeth t on the edge of plate n. As the machine is operated and the traveler ascends it will be seen that the arm or spring m' will come in contact with said teeth t, thus imparting an impulse by closing the circuit at each tooth, the circuit being broken by the space between the teeth, as there is nothing there for the arm m' to come in contact with, and thus there will be conveyed to the receiving-instrument (which may be located at any desired point) as many signals or impulses as there are teeth brought in contact with the spring-arm m'.

As the number of signals or impulses requires to be varied, in order to correspond with the number of the district in which the fire may occur, the plate t'' is raised or lowered, so as to expose more or less of the teeth to come in contact with arm m' as may be necessary to strike the number of the district. This regulation of the number of strokes or impulses is accomplished by the attendant simply moving the index X to the figure denoting the number of the district on the district dial or plate X², which operation elevates or depresses the plate t'' and exposes more or less of the teeth t, as hereinbefore described. As there are also several stations in each district it is necessary that some means be provided by which the number of strokes or impulses indicating the number of the station may also be regulated. This is accomplished by moving the index Z to the number indicating the station on the station-dial Z', whereby the plate C, and with it the stud o, is raised or lowered, so as to hold spring e in contact with the plate n for a longer or shorter period, thus giving more or less strokes, according to the number of the station to be indicated.

The object of the space t' is to permit or cause an interval of time between the strokes indicating the district and those indicating the station, which shall be greater than that between those which indicate the district only, thereby preventing confusion and rendering the signals conveyed clear and distinct. To obviate still further any liability to confusion I construct my apparatus in such a manner that the signals indicating the station shall be repeated at much shorter intervals than those indicating the district. This may be done in several ways, one of the most obvious of which is to make the teeth on plate n which are above the space t', and which indicate the number of the station, much nearer each other than are those below the space, and which indicate only the district. This arrangement of teeth is indicated in red on plate n of Fig. 7. Another method (shown in my drawings) is to so arrange the size and speed of shaft B that it shall perform two revolutions while the arm e is passing from one to another of the teeth t. I then place upon the upper end of shaft B an eccentric, x, which at each revolution of the shaft comes in contact with a key or spring, v, to which the wire from the generator is connected, instead of to the frame E, as in the former case. In this case it is obvious that the circuit will only be completed when the spring v and eccentric x are in contact, and also the arm e and the teeth on plate n. As the shaft B makes two revolutions during the time occupied by e in passing from one to another of the teeth t it follows that the connection between x and v occurs twice as often as between m' and t; but no current can pass until the connection is complete at both points, which can occur only at each alternate revolution of the wheel. When the arm $m'$ has passed above the space $t'$ it will remain in contact with the smooth edge of plate $n$, (there being in this case no teeth above that point,) and then the circuit will be completed at each revolution of shaft B, whereby the signals or impulses indicating the number of the station will be repeated twice as often as those previously given, indicating the district. By these means I am enabled to convey the desired signals with certainty, the signals or impulses themselves being produced by an automatic or mechanical operator, the attendant having no other duty to perform than simply to place the indexes X and Z at the proper figures on their respective dials and start the machine.

A modification of my device is also shown in Fig. 7, the object of which is to substitute rotary motion for the rectilinear or reciprocating motion necessary to operate the device when constructed as above described. In this case A represents a wheel secured to the pivoted lever $A^2$. This wheel is provided with serrated teeth for about one-half of its circumference, which engage with the screw $c^5$ when thrown into gear therewith. Inserted into the side or face of the wheel A is a series of pins, $h$, equidistant from one another, and of such number as may be desired. As the wheel A is caused to move forward by the screw $c^5$ the pins $h$ come in contact with the end of spring $g$, thus closing the circuit, which is again broken by the space between the pins $h$, whereby the signal is repeated the proper number of times. When the wheel A has moved the required distance, which must always be less than a whole revolution, it is thrown out of gear by any suitably-operating automatic device, and is returned to its original position by means of a spiral spring, weight, or any equivalent device.

The district and station indexes may be connected with the partially-rotating wheel A in any suitable manner, by which they shall be made to regulate the number of strokes or impulses desired, the pins in the wheel or segment A corresponding to and answering the same purpose as the teeth $t$ on plate $n$.

Figs. 4, 5, and 6 exhibit still another modification of my improvement, by which signals are conveyed by use of a key, $f$. To the under side of this key $f$ is secured a spring, $e^3$, the end of which, passing through an opening in a stud attached to the under side of key $f$, comes in contact with a cam, $e^2$, on shaft $c$. This cam $c$ extends half-way around said shaft, and is so located thereon as to be in contact with spring $e^2$ only so long as a current is passing in one direction from the magneto-electric machine, by which means a current in one direction only is used to impart signals or impulses to the receiving-machine. As the spring $e^3$ is forced to one side by the cam $e^2$ it is received and held in a notch in the stud $f'$, as indicated in Fig. 6, its original position being shown by Fig. 5, and is thereby prevented from coming in contact with the cam again until, by removing the pressure from the key $f$, spring $e^3$ is brought in contact with a cross-bar, $f^2$, (shown in Fig. 7,) whereby it is released from the notch in stud $f'$ and returns to its original position, ready to be again brought in contact with cam $e^2$ by repeating the pressure upon the key $f$. In Fig. 4 the key $f$ is shown inverted, for the purpose of showing more clearly the spring $e^3$ and its attachment to the key.

Having thus fully described the construction and operation of my invention, what I claim, and desire to secure by Letters Patent, is—

1. In a fire-alarm telegraph, the combination, with a magneto-electric machine, of the automatic-operating mechanism to take the place of an operator, and so constructed as to convey any required number of signals at uniform or varying intervals without any other manipulation than properly setting the indexes before starting the machine.

2. The traveler $l$, constructed and operating substantially as described.

3. Regulating the number of signals or impulses by means of the sliding rod D and plate $t''$ operated by the attendant, substantially as specified.

4. The oscillating wheel A, when constructed and operating substantially as and for the purpose set forth.

5. The key $f$, provided with the spring $e^3$, when constructed and operating in the manner and for the purpose set forth.

6. The key $f$, constructed as described, in combination with the cam $e^2$, operating in the manner and for the purpose set forth.

7. So constructing and arranging the automatic operators A and $l$ that they can be thrown in and out of connection with the actuating mechanism at pleasure.

CHARLES KIRCHHOF.

Witnesses:
I. CHR. FRIEDMANN,
WM. H. NAFIS.